United States Patent [19]
Schlagel

[11] Patent Number: 5,593,019
[45] Date of Patent: Jan. 14, 1997

[54] CHAIN RETURN SUPPORT

[76] Inventor: William A. Schlagel, 300 NW. 97th La., Coon Rapids, Minn. 55433

[21] Appl. No.: 368,956

[22] Filed: Jan. 5, 1995

[51] Int. Cl.$^6$ .................................................. B65G 19/30
[52] U.S. Cl. ........................ 198/721; 198/841; 198/735.3
[58] Field of Search ................................... 198/721, 727, 198/733, 735.2, 735.3, 841

[56] References Cited

U.S. PATENT DOCUMENTS

| | | | |
|---|---|---|---|
| 3,596,752 | 8/1971 | Garvey | 198/841 X |
| 3,605,994 | 9/1971 | Parlette | 198/841 X |
| 3,881,594 | 5/1975 | Jepsen | 198/841 X |
| 4,051,948 | 10/1977 | Sackett, Sr. | 198/735.3 X |
| 4,183,430 | 1/1980 | Hunter | 198/841 X |
| 4,222,482 | 9/1980 | Kelley | 198/841 X |
| 4,545,477 | 10/1985 | Besch | 198/841 |
| 4,556,143 | 12/1985 | Johnson | 198/841 |
| 4,951,809 | 8/1990 | Boothe et al. | 198/841 |

Primary Examiner—D. Glenn Dayoan
Attorney, Agent, or Firm—Palmatier, Sjoquist & Helget, PA

[57] ABSTRACT

A chain return support suitable for use in an en masse grain conveyor has a track with a pair of angle irons extending lengthwise in the interior of a trough and supported by horizontal cross members bridging two side walls of the trough. The angle irons have inwardly facing horizontal edge portions and vertical lower portions. A plastic slide is inserted between the angle irons and is engaged with the angular edge portions by way of grooves extending lengthwise on side surfaces of the plastic slide. Stops on the cross member contact the lower portions of the angle iron for proper positioning of the track. The plastic slide provides a low friction surface for supporting the chain return section.

20 Claims, 7 Drawing Sheets

CHAIN RETURN SUPPORT

BACKGROUND OF THE INVENTION

This invention relates to grain conveyors. More particularly the invention relates to en masse grain conveyors with chain return supports.

An en masse conveyor will typically comprise an elongate trough with a roller chain looped between a first sprocket at one end of the trough and a second sprocket at the opposite end. Grain is deposited in an inlet region adjacent the first sprocket and is discharged from an outlet region below the second sprocket. A plurality of paddles attached to the roller chain at spaced intervals extend across the trough for moving the grain. The lower section of the looped chain travels from the first sprocket to the second sprocket and moves grain en masse by the paddles toward the second sprocket. The paddles slide along the bottom of the trough providing support for the lower section of the roller chain. The upper chain return section completes the chain loop and returns the chain to the first sprocket.

The chain return section requires support intermediate the sprockets to minimize sagging and excess tension in the chain. Such en masse conveyors can have capacities ranging from hundreds to tens of thousands of bushels per hour and can vary in length up to several hundred feet. Consequently, the chain lengths can be extensive. Such conveyors are typically driven by electric motors with horsepower ratings that may exceed 100 hp for high capacity en masse conveyors. In such conveyors, a suitable low friction return section can be critical to support the efficient operation of the conveyor. Such sagging and tension can have several negative effects including excessive chain and sprocket wear along with a reduction of the conveying capacity of the conveyor. These problems are exacerbated as the capacities or the length of the conveyor increases.

Figure 1A:
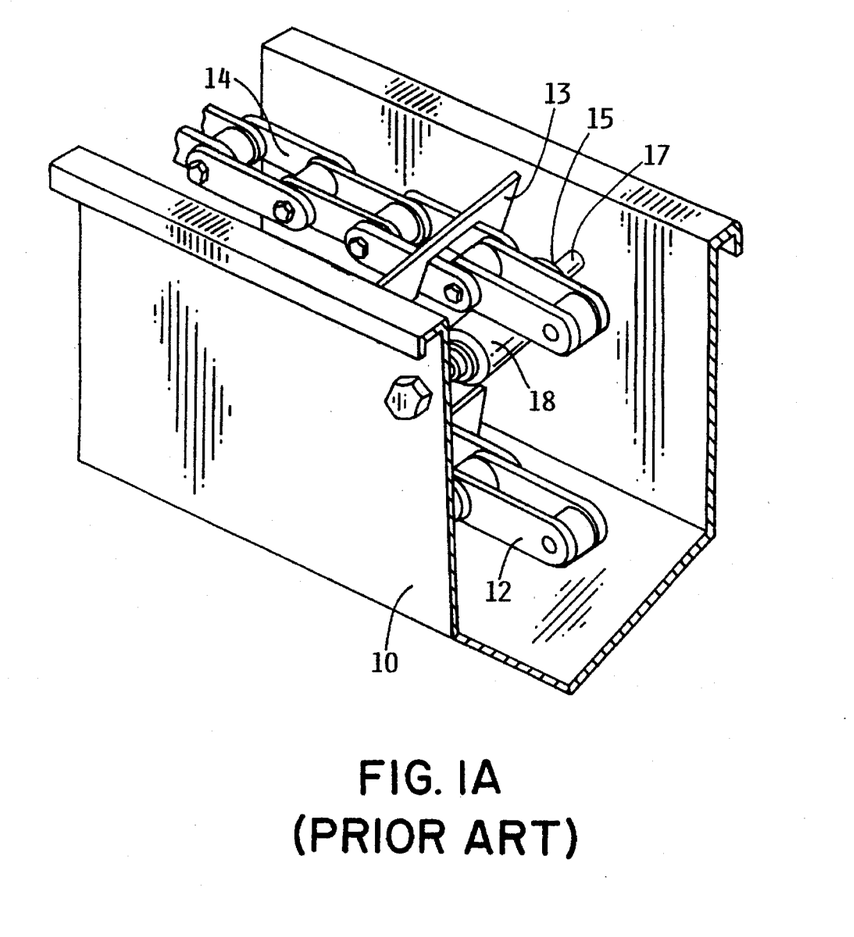
FIG. 1A is a partial sectional of a portion of the prior art conveyor with a roller being utilized for a chain return.
Figure 1B:
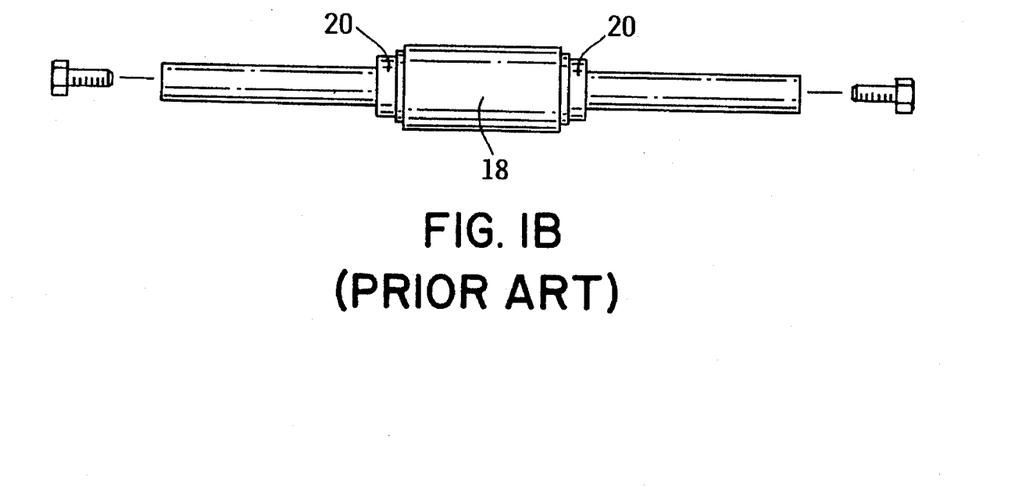
FIG. 1B is a plan view detail of the prior art roller of FIG. 1A.
Figure 2A:
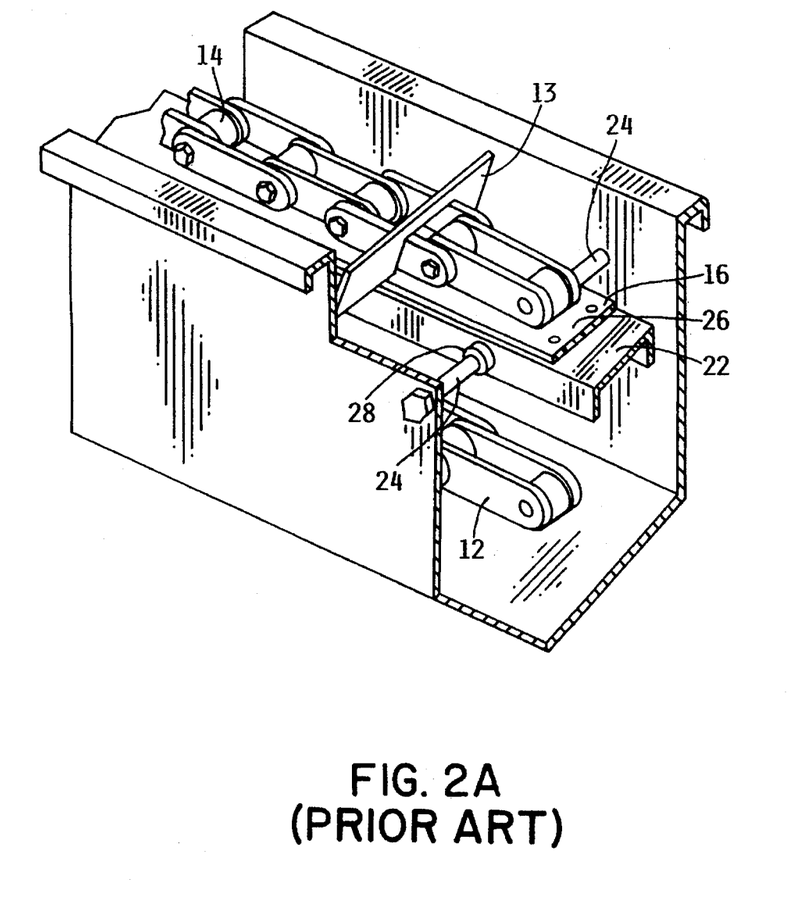
FIG. 2A is a partial sectional view of a portion of a prior art conveyor with a channel iron support for the chain return.
Figure 2B:
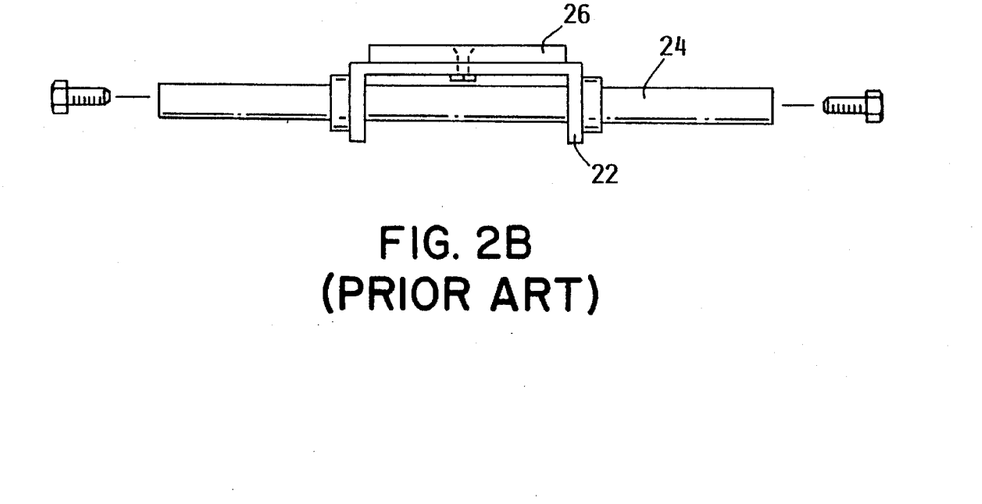
FIG. 2B is an end view of the channel iron support for the chain return shown in FIG. 2A.

Two prior art means of providing chain return supports for en masse conveyors are depicted in FIGS. 1A, 1B, 2A and 2B. Two en masse conveyors portions are depicted in FIGS. 1A and 2A, each with a trough 10, a lower chain section 12, paddles 13, an upper return section 14, and chain return supports 15, 16. FIGS 1B and 2B are end views of the chain return supports of FIG. 1A and 2A. The chain return support of FIGS. 1A and 1B is comprised of a horizontal shaft 17 supporting a plastic roller 18. An appropriate number of shafts and plastic rollers are utilized to support the channel iron along the length of the chain return section 14.

The chain return support of FIGS. 1A and 1B has drawbacks associated with the limited support points and the distance between the supports. Sagging between shaft and roller members can still be a concern and wear of the roller can also be excessive requiring more frequent maintenance.

FIGS. 2A and 2B depict a chain return support comprised of a channel iron 22 supported by a cross member or shaft 24 with a strip of plastic 21 riveted or screwed to the channel iron 22. An appropriate number of shafts are utilized to support the channel iron along the length of the chain return section 12. Collars or stops 28 are used to center the channel iron on the shaft. This support has also been used in prior art conveyors without the plastic strip. However, this results in undesirable metal to metal contact between the chain and the support and resultant excess wear and noise generation.

Ultra high molecular weight (UHMW) polyethylene plastic is suitably used for the surfaces contacted by the return chain section. UHMW plastic offers a very low coefficient of friction, causes virtually no wear to the metal parts of the roller chain, provides low noise generation, is inexpensive and is easily fabricated. UHMW does have relatively high temperature expansion and contraction characteristics, particularly compared to steel.

These temperature characteristics of UHMW plastic when attached to the steel channel iron can create problems in the chain return support configuration shown in FIGS. 2A and 2B. The rivets or bolts have not provided a satisfactory means of connecting the plastic strip 26 to the channel iron 22. The different expansion and contraction rates cause problems such as the strip 26 separating from the channel iron 22, the strip tearing or fracturing at the rivets or screws, bowing and cupping of the strip.

SUMMARY OF THE INVENTION

Disclosed is an improved chain return support suitable for use in an en masse grain conveyor. The chain return support is comprised of track comprised of a pair of angle irons extending lengthwise in the interior of a trough and supported by horizontal cross members bridging two side walls of the trough.. The angle irons have inwardly facing horizontal edge portions and vertical lower portions. A plastic slide is inserted between the angle irons and is engaged with the annular edge portions by way of grooves extending lengthwise on side surfaces of the plastic slide. Stops on the cross member contact the lower portions of the angle iron for proper positioning of the track. The plastic slide provides a low friction surface for supporting the chain return section.

A feature and advantage of the invention is that expansion and contraction of the plastic slide is absorbed by the track.

A feature and advantage of the invention is that the plastic slide by way of the grooves functions to maintain the position of the angle irons in their upright position where they provide maximum structural strength in supporting the chain return portion. Moreover, any lateral flexing of the plastic slide due to the weight of the chain return section functions to provide an outward moment on the vertical portions of the angle iron. This outward movement secures the angle irons against the stops.

A further advantage of the invent ion is that the support is low friction and it extends substantially the entire length of the chain return section.

A feature and advantage of the invention is that the slide may be easily inserted into the track facilitating maintenance.

An advantage of the invention is that fabrication requires less labor than the chain return support of FIGS. 1A and 1B. The track, plastic slide, and horizontal cross members of the claimed invention may be assembled without fasteners. Riveting or screwing of the plastic strip of the chain return support of FIGS. 1A and 1B in not required. Additionally, all component parts are readily available and relatively inexpensive.

DETAILED DESCRIPTION OF THE PREFERRED EMBODIMENTS

Figure 3:
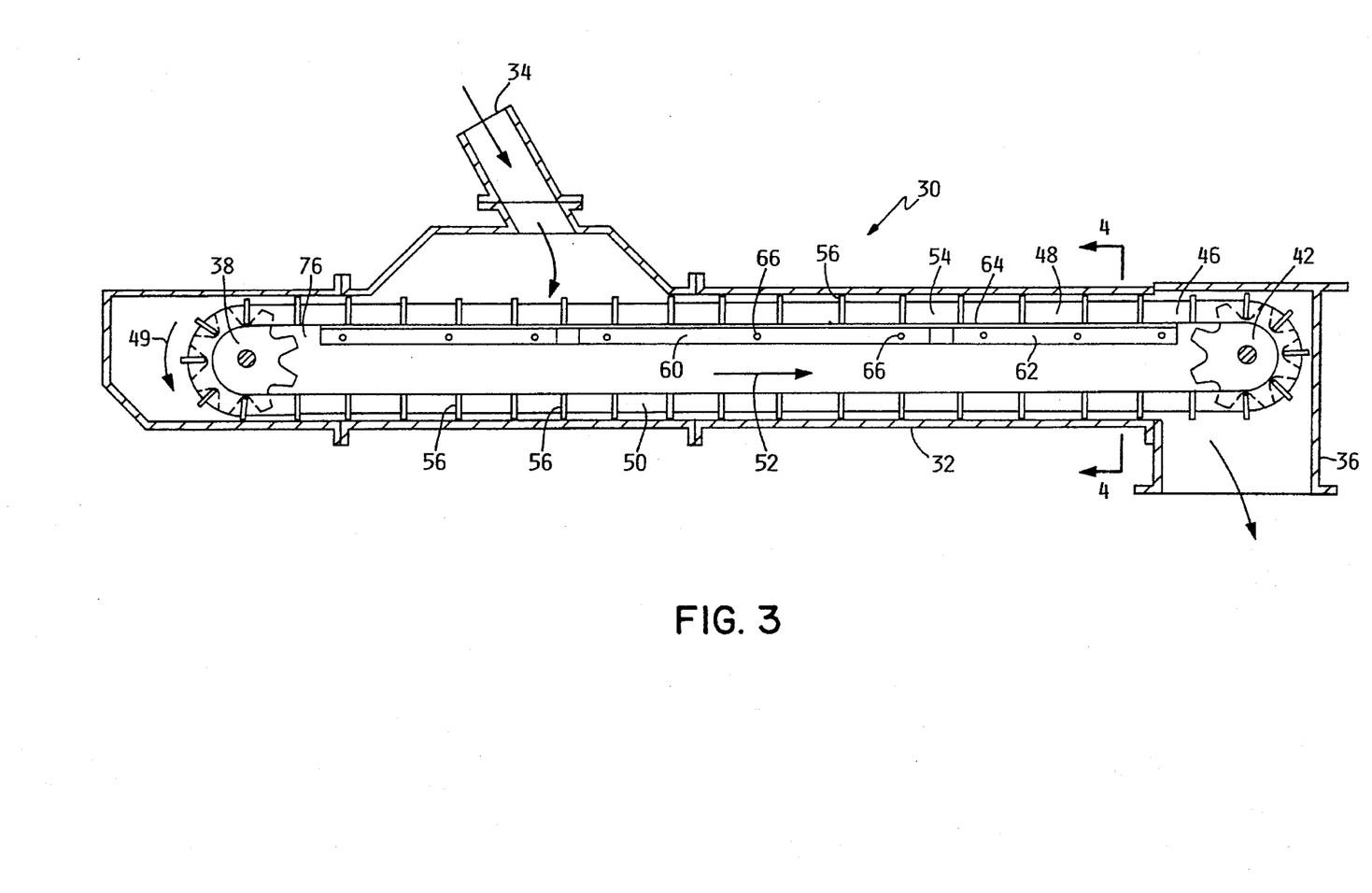
FIG. 3 is a diagrammatic cut away view of an en masse conveyor with the chain return support.

Referring to FIG. 3, a sectional diagrammatic view of an en masse conveyor is shown and is generally identified by the numeral 30. The en masse conveyor has a trough 32, an inlet 34 and an outlet 36. A first sprocket 38 is located at an end of the conveyor 40 and a second sprocket 42 is located at the opposite end 44 above the outlet 36 of the conveyor 30. A roller chain 48 is engaged on both sprockets forming a loop 46. Either sprocket may be suitably driven for rotation of the chain loop 46 in the direction as indicated by the arrow 49. The chain loop 46 has a lower section 50 that moves in the direction of the arrow 52 which also is the direction of travel of the grain being conveyed. The chain loop 46 also has an upper return section 54. The chain 48 has a plurality of paddles 56 which function when in the lower section 50 to convey the grain en masse toward the outlet 36. The paddles 56 slide along the bottom 58 of the trough 32.

The chain return support generally indicated by numeral 60 is shown in a support position under the chain return section 54. The chain return support 60 is comprised principally of a track 62, a slide 64, and supporting cross members 66. The chain return support 60 extends substantially the length of the chain return section 54.

Figure 4:
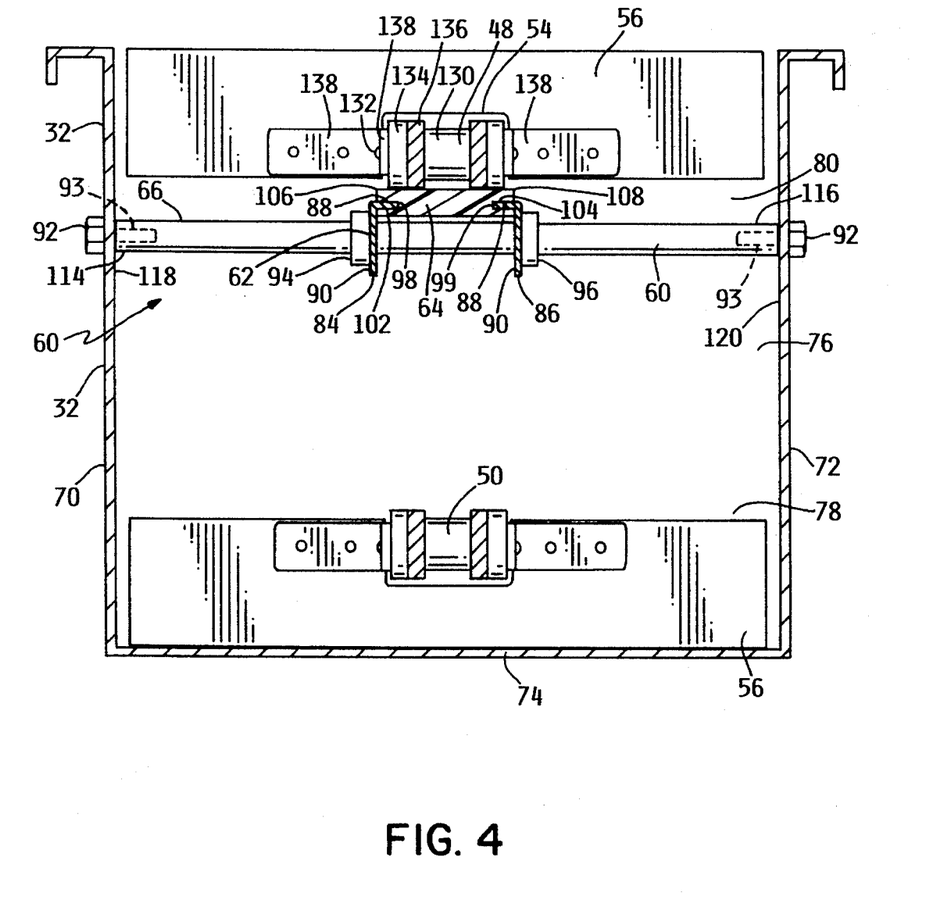
FIG. 4 is a sectional view taken at line 2—2 of FIG. 3 of the en masse conveyor with the chain return.
Figure 5:
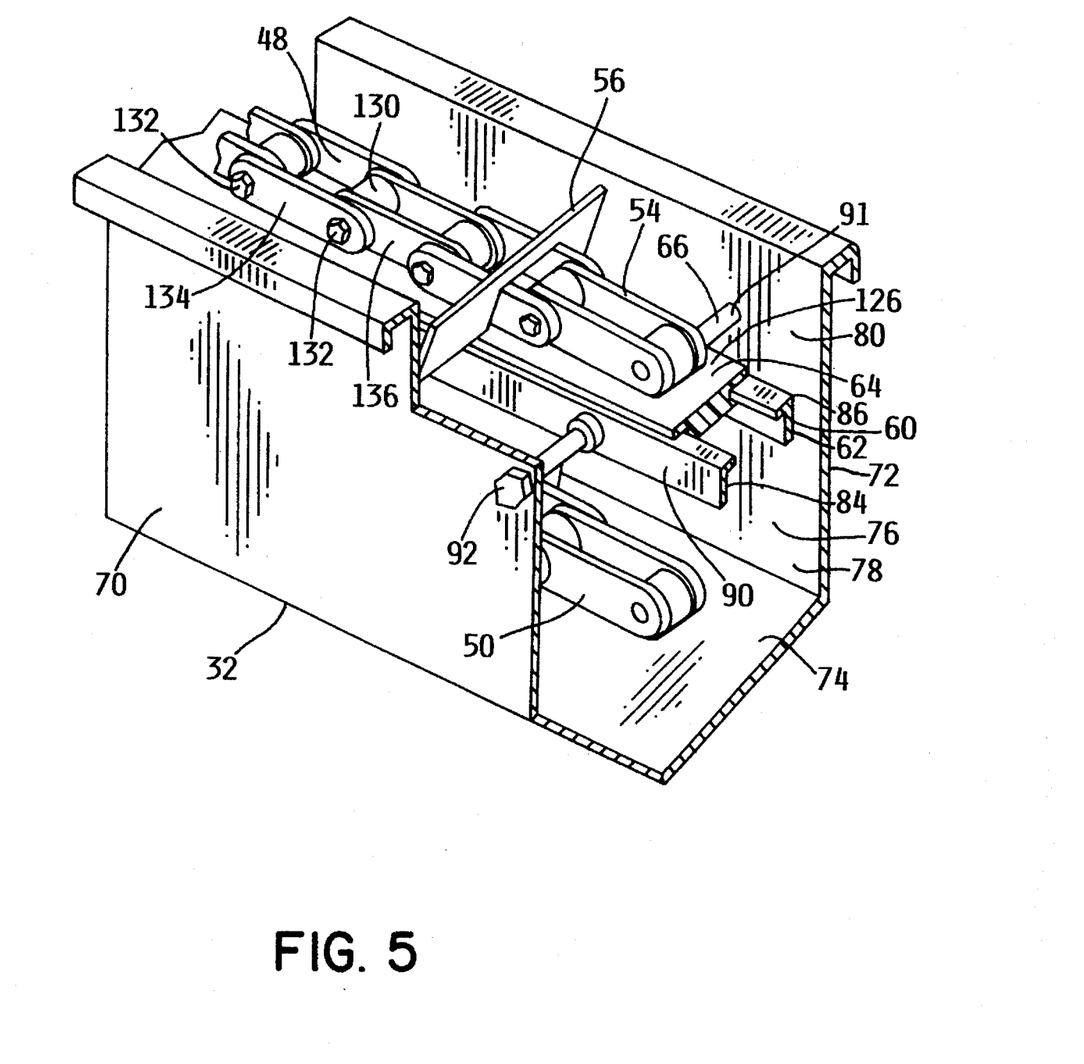
FIG. 5 is a perspective view of a portion of the en masse conveyor of FIGS. 3 and 4 showing the chain return support.

Referring to FIGS. 4 and 5, a cross-sectional view and a perspective cutaway view of the en masse conveyor with the chain return support 60 are shown. The roller chain 48 is generally of conventional configuration with paddles 56 suitably attached at a perpendicular orientation to the roller chain 48. The trough 32 has opposing sidewalls 70, 72 and a bottom wall 74 which define an open interior 76. The open interior 76 has a lower region 78 and an upper region 8. The lower section 50 of the roller chain 48 travels in the lower region 78 and is supported on the bottom wall 74 by way of the paddles 56. The chain return section 54 travels on the upper region and is supported by the chain return support 60.

The trough may be conventionally fabricated from sheet metal. The paddles 56 may be fabricated from UHMW plastic which provides a low coefficient of friction with respect to the bottom wall 74 and sidewalls 70, 72.

Continuing to refer to FIGS. 4 and 5, the track 62 is comprised of a pair of angle irons 84, 86 both of which have an upper portion 88 and a lower portion 90. The supporting cross members comprise a shaft 91 which extends through both angle irons 84, 86 and is secured to the trough sidewalls 70, 72 by screws 92 engaged with threaded bores 93 in the shaft 91. A pair of collars or stops 94, 96 prevent outward axial movement on the angle irons 84, 86 on the shaft 91. The collars 94, 96 may be secured to the shaft 91 by way of set screws (not shown). The upper portions 88 of the angle irons 84, 86 tach have edge portions 98, 99 which are inwardly facing and which engage with the longitudinal, parallel, and horizontal grooves 102, 104 in the sides 106, 108 of the elastic slide 64. The plastic slide 64 may be extruded of fabricated out of bar stock of UHMW plastic by sawing slots or grooves 102, 104 into the sides 106, 108 of said stick.

The length of the shafts 91 is sized to the width of the open interior 76 of the trough 32 and the ends 114, 116 of the shaft 91 contact the inside surfaces 118, 120 of the side walls 70, 72. The cross member or shaft 91, in addition to supporting the track 62 also provides structural support to the trough 32.

The plastic slide 64 has a smooth top surface 126 which supports the roller chain 48. The roller chain 48 has a plurality of rollers 130, pins 132, pin links 134, and roller links 136. A pair of paddle%attachment plates 138 are riveted or otherwise suitable secured to each paddle 56. The attachment plates 138 age suitable attached to the roller chain such as by the pins 132 or the plates may be integral with the pin links 134.

Figure 6:
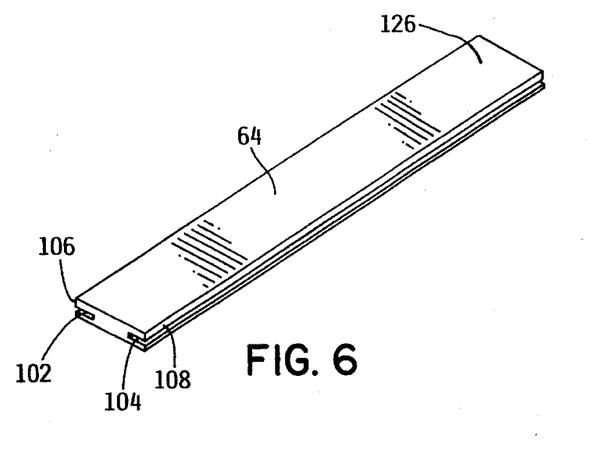
FIG. 6 is a detail of the plastic slide of the chain return support.
Figure 7:
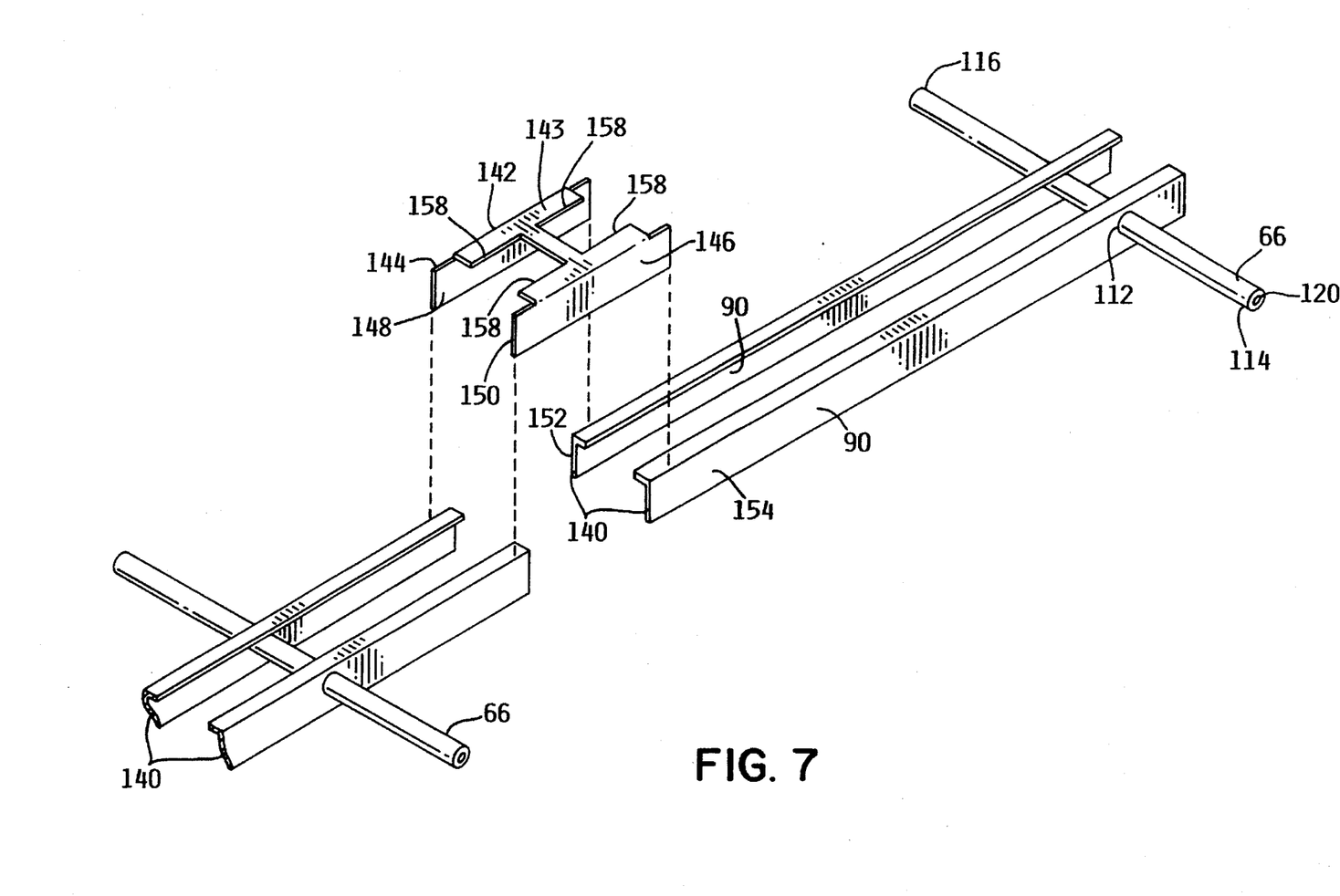
FIG. 7 is a partially exploded view depicting the track with a connector joining sequential pairs of angle irons.
Figure 8:
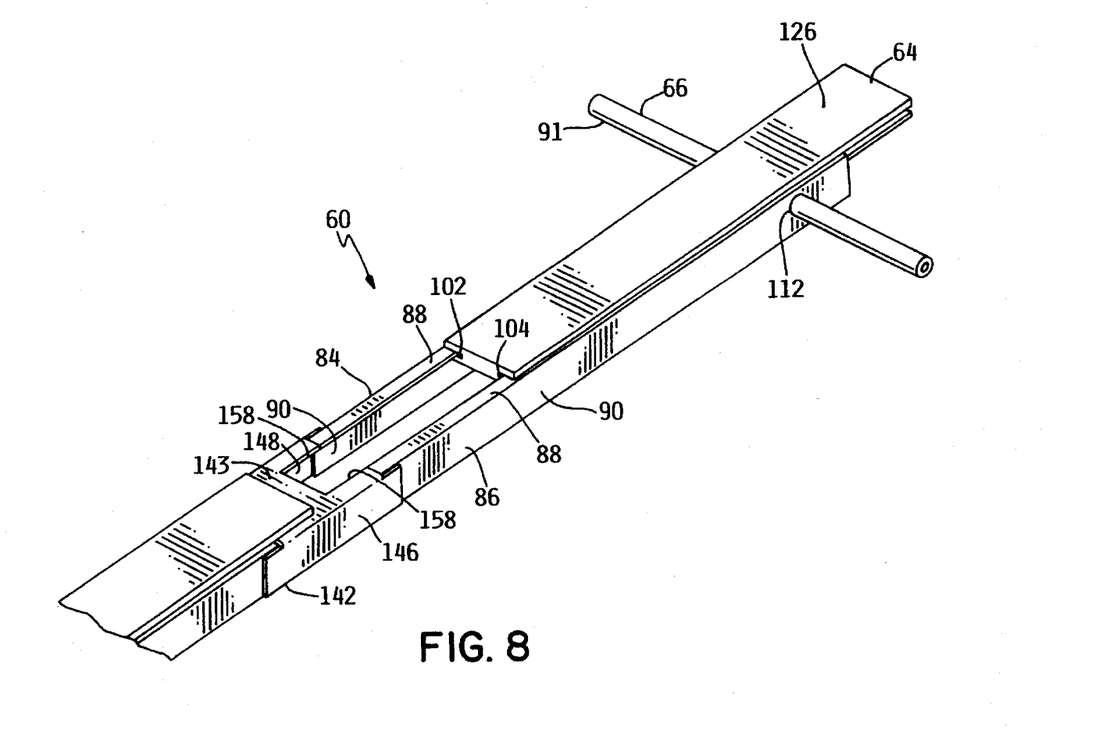
FIG. 8 is a perspective view of to chain return support showing a plastic slide inserted and a plastic slide partially inserted in the track.

Referring to FIGS. 6, 7, and 8, details of the connection between adjacent track sections are shown along with the interrelation of the plastic slide 64. The grooves 102, 104 are sized to the thickness of the upper portions 88 of the angle irons 84, 86. The angle irons 84, 86 are conventional angle irons cut to appropriate size. The shafts may be fabricated from cylindrical bar stock.

The plastic slide 64 is shown in detail in FIG. 6. The slide has a prone H-shaped cross-section. The horizontal grooves 102, 104 extend laterally inward from the sides 106, 108 of the slide 64. The slide engages with the angle irons 84, 86 which are arranged in pairs 140 as shown in FIGS. 7 and 8. The grooves 102, 104 are appropriately sized to allow a snug fit and to further allow the slide to be slidably engaged with the upper portions 88 of the angle irons 84, 86. Sequential pairs 140 of angle irons which also constitute track sections 140 may be joined by way of a H-bar connector 142 which is shown separated from the angle irons in FIG. 7 and in place in FIG. 8. The connector 142 has an H-shape top portion 143 with opposing parallel side panels 144, 146 with inwardly facing surfaces 148, 150 which are sized to contact the outside surfaces 152, 154 of the vertical lower portions 90 of the angle irons 84, 86. The H-shaped top portion 143 has two pairs of inwardly facing edge portions 158. The opposing edge portions 158 of the connector 142 also engage the grooves 102, 104 of the plastic slide 64. The connector is placed intermediate subsequent pairs of angle irons with the H-shaped top portion 143 coplanar to the upper portions 88 of the angle irons to accommodate the slide within the upper receiving areas of the connector 142. Significantly, the connector portion is secure as part of the track 62 without the necessity of using fasteners such as crews or rivets. This facilitates assembly, repair, ant maintenance of the chain return support 60.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A grain conveyor apparatus comprising:

a) an elongate conveyor trough comprised of two opposing side walls, a bottom wall, a first end, and a second end, the side walls and bottom wall defining an open interior, the open interior having an upper region and a lower region;

b) a drive sprocket and a tail sprocket, the drive sprocket mounted at the first end of the conveyor trough and the tail sprocket moulded at the second end;

c) a conveyer chain engaged with the tail sprocket and drive sprocket extending lengthwise in the open interior of the conveyor trough, the chain having a lower conveying section and an upper return section, the chain comprised of a plurality of paddles extending laterally in the open interior for moving the grain;

d) a chain return comprised of
  i) a track comprised of a pair of inwardly facing horizontal edge portions, the track extending lengthwise in the upper region of the open interior of the trough; and
  ii) a slide having a prone H-shaped cross-section, the slide comprising two upright sides and a smooth and flat top surface for supporting the return section, the top surface extending continuously between the two upright sides, each of the two sides having an inwardly extending groove sized for receiving one of the edge portions, the edge portions engaged within said grooves whereby the slide and the return section on said slide are supported by the track, the slide engaged with the edge portions; and e) a plurality of cross support members bridging the opposing side walls and supporting the track.

2. A grain conveyor apparatus of claim 1 wherein the track is comprised of a pair of opposing angle irons, each angle iron having an inwardly facing horizontal portion and a vertical portion and wherein each edge portion is part of said horizontal portion of the angle irons and wherein the cross support member supports said trick at the vertical portions of said angle irons.

3. The grain conveyor apparatus of claim 1, wherein the slide is supported exclusively by the edge portions engaged with the slide.

4. The grain conveyor apparatus of claim 3, wherein each angle iron has a plurality of apertures and the cross support members extend through said apertures.

5. The grain conveyor apparatus of claim 2, wherein each cross support member has a pair of stops for positioning the track.

6. The grain conveyor apparatus of claim 5, wherein the chain return is comprised of a plurality of pairs of angle irons sequentially aligned, and a plurality of slides aligned end-to-end.

7. The grain conveyor apparatus of claim 6 wherein each pair of angle irons is engaged with a slide.

8. The apparatus of claim 1, wherein the slide is plastic.

9. The apparatus of claim 1, wherein the track is comprised of track sections positioned end to end and the slide is comprised of slide sections.

10. The grain conveyor apparatus of claim 9, wherein each sequential track section is joined by a connector, the connector having an upper position with two pairs of opposing inwardly facing edge portions engaged with the grooves in the sequential slide sections and further comprised of parallel vertical panels sized to contact the track section.

11. The grain conveying apparatus of claim 10, wherein the parallel vertical panels of the connector have inwardly facing surfaces sized to retain the vertical portions of the sequential angle irons.

12. A chain return support for a grain conveyor, the grain conveyor comprised of an elongate trough with opposing side walls, the side walls defining an open interior, and an upper chain return section, the chain sections extending lengthwise through the interior, the chain return support comprising:

a) an elongate plastic slide extending lengthwise intermediate the side walls of the conveyor, the slide having a top surface for supporting the chain return section and a pair of horizontal grooves extending lengthwise, b) a track comprising a pair angle irons, each having an inwardly extending edge port ion engaged with one of the horizontal grooves in plastic slide and each having a vertical portion integral with a respective edge portion, and c) a cross member extending from a side wall of the trough and engaging with the vertical portions of the angle iron for supporting and positioning the track and plastic slide, the cross member placed to position the plastic slide under the chain return section.

13. The chain return support of claim 10 wherein the track is comprised of a pair of angle irons, the angle irons each comprised of the vertical portion and a horizontal portion, each horizontal portion comprising an edge portion.

14. The chain return of claim 12 wherein the cross member extends from one side wall to the other side wall, wherein the angle irons each have an aperture in their vertical portions and wherein the cross member extends through said apertures.

15. The chain return of claim 12 wherein the slide has prone H-shaped cross-section.

16. The chain return support of claim 14, wherein the grooves are substantially horizontal and wherein the slide is plastic.

17. The chain return of claim 14, further comprising a pair of stops on the cross member to retain the track and plastic slide in position.

18. The apparatus of claim 15, wherein the track is comprised of sequential track sections and the slide is comprised of sequential slide sections.

19. The apparatus of claim 18, further comprising a connector with a pair of edge positions engaged with the grooves in the sequential slide sections.

20. The apparatus of claim 19, wherein the connector is further comprised of opposing side walls retaining the sequential track sections.

* * * * *

UNITED STATES PATENT AND TRADEMARK OFFICE
CERTIFICATE OF CORRECTION

PATENT NO. : 5,593,019
DATED : January 14, 1997
INVENTOR(S) : Schlagel, William

It is certified that error appears in the above-indentified patent and that said Letters Patent is hereby corrected as shown below:

Column 3, line 12, delete "to", and substitute --the--.

Column 3, line 48, delete "8", and substitute --80--.

Column 4, line 1, delete "tach", and substitute --each--.

Column 4, line 5, delete "of", and substitute --or--.

Column 4, line 6, delete "slots", and substitute --slits--.

Column 4, line 7, delete "stick", and substitute --stock--.

Column 4, line 17, delete "%".

Column 4, line 19, delete "age", and substitute --are--.

Column 4, line 54, delete "crews", and substitute --screws--.

Column 4, line 54, delete "ant", and substitute --and--.

Column 5, line 35, delete "trick", and substitute --track--.

Column 6, line 1, delete "position", and substitute --portion--

Column 6, line 20, after "pair", insert --of--.

Column 6, line 22, after "in", insert --the--.

UNITED STATES PATENT AND TRADEMARK OFFICE
CERTIFICATE OF CORRECTION

PATENT NO. : 5,593,019
DATED : January 14, 1997
INVENTOR(S) : Schlagel, William

It is certified that error appears in the above-indentified patent and that said Letters Patent is hereby corrected as shown below:

Column 6, line 51, delete "positions", and substitute --portions--.

Signed and Sealed this

Fourth Day of November, 1997

Attest:

BRUCE LEHMAN

Attesting Officer

Commissioner of Patents and Trademarks